United States Patent [19]
Ibori et al.

[11] Patent Number: 5,177,678
[45] Date of Patent: Jan. 5, 1993

[54] INVERTER APPARATUS FOR PREVENTING AN OVERINCREASE OF OUTPUT FREQUENCY

[75] Inventors: Satoshi Ibori, Funabashi; Noritoshi Tuzi, Narashino; Yasumasa Toudou, Funabashi; Hiroshi Fujii, Chiba; Takatsugu Kambara, Funabashi, all of Japan

[73] Assignee: Hitachi, Ltd., Tokyo, Japan

[21] Appl. No.: 701,033

[22] Filed: May 16, 1991

[30] Foreign Application Priority Data

Aug. 2, 1990 [JP] Japan .................. 2-203870

[51] Int. Cl.⁵ ........................... H02M 7/5387
[52] U.S. Cl. ............................. 363/98; 363/37; 363/95
[58] Field of Search ............ 363/34, 37, 95, 96, 363/97, 98, 132, 137

[56] References Cited

U.S. PATENT DOCUMENTS

| | | | |
|---|---|---|---|
| 4,124,885 | 11/1978 | Nordby | 363/96 |
| 4,635,177 | 1/1987 | Shekhawat et al. | 363/98 |
| 4,651,070 | 3/1987 | Truman et al. | 363/124 |
| 4,689,542 | 8/1987 | Ibori et al. | 318/806 |
| 4,712,170 | 12/1987 | Grace | 363/132 |
| 4,820,891 | 4/1989 | Tanaka et al. | 363/97 |
| 4,905,134 | 2/1990 | Recker et al. | 363/37 |
| 4,924,168 | 5/1990 | Horie et al. | 318/811 |
| 4,964,027 | 10/1990 | Cook et al. | 363/95 |
| 4,994,950 | 2/1991 | Gritter | 318/811 |
| 5,010,223 | 4/1991 | Kim | 363/97 |
| 5,124,518 | 6/1992 | Lee | 363/98 |

*Primary Examiner*—Steven L. Stephan
*Assistant Examiner*—Jeffrey Sterrett
*Attorney, Agent, or Firm*—Antonelli, Terry, Stout & Kraus

[57] ABSTRACT

An inverter apparatus using a microcomputer control system suitable for use in driving an ac rotary electric machine is concerned. The inverter apparatus includes a device for detecting an output current or an output voltage of the inverter apparatus or a control signal supplied to the inverter apparatus and, from the detected result, detecting an output frequency of the inverter apparatus and a switch structure having memory function by means of change-over and selection of lines for holding data for setting therein an upper limit of the output frequency of the inverter apparatus in hardware manner. Thus, the device for detecting the output frequency of the inverter apparatus produces the output frequency of the inverter apparatus and the switch structure produces the exact upper limit of the output frequency which is not influenced by noise or the like. The comparison therebetween can suppress the output frequency of the inverter apparatus to the upper limit always reliably without permanent change due to noise or the like and a fear of changing data so that occurrence of over-rotational speed operation of the driven ac rotary electric machine can be prevented sufficiently.

10 Claims, 8 Drawing Sheets

INVERTER APPARATUS FOR PREVENTING AN OVERINCREASE OF OUTPUT FREQUENCY

BACKGROUND OF THE INVENTION

The present invention relates to an inverter apparatus using a microcomputer control system, and more particularly, to an inverter apparatus suitable for use in driving an ac rotary electric machine such as an induction motor, a rotary machine including a synchronous machine and a dc machine.

An inverter apparatus is widely used in variable speed control of an induction motor. Recently, inverters controlled by a microcomputer are being utilized and various control functions of the inverters can be attained by the microcomputer.

However, in a system using such an inverter apparatus, if an output frequency of the inverter apparatus is increased greatly due to any trouble such as, for example, external noise, a rotational speed of the induction motor is also increased and in a large system, particularly, there is a fear that any instrument may be destroyed.

In such a system, heretofore, it is known that a predetermined upper limit for the output frequency of the inverter is set as described in Japanese Patent Unexamined Publication No. 62-201081.

A parameter setting device of a motor controller described in the Publication 62-201081 includes memory holding function provided in parameter adjusting means as parameter storing means independently. More particularly, a plurality of parameter adjusting means are replaced by a combination of a single parameter adjusting means, parameter selecting means for specifying a kind of parameter and parameter storing means for storing parameter values in predetermined locations.

In the above prior art as disclosed in the Publication 62-201081, the setting function of the predetermined upper limit is attained by a software processing of the microcomputer. More particularly, in the prior art, the predetermined upper limit of frequency is set as a memory data and the upper limit is compared in the software manner with a binarized signal for controlling an output frequency supplied to a main circuit of the inverter by the microcomputer to control the output frequency of the inverter not to exceed the upper limit.

In the prior art, since the upper limit of frequency set as the memory data is generally converted into a binary code, the upper limit is easily re-written into another value by noise and the whole system is stopped. Further, confirmation as to whether the frequency control signal produced by the microcomputer is correct or not is not taken into consideration. Thus, there is a problem that the upper limit for the output frequency of the inverter is not set reliably.

SUMMARY OF THE INVENTION

It is a main object of the present invention to provide an inverter apparatus which can always reliably suppress unusual increase of an output frequency even when any trouble occurs in the inverter apparatus and can prevent occurrence of operation with over-rotational speed of an ac rotary electric machine such as an induction motor driven by the inverter apparatus.

It is another object of the present invention to prevent over-rotation of an ac rotary electric machine without any influence by external noise.

It is still another object of the present invention to prevent over-rotation of an ac rotary electric machine without use of an expensive rotational speed detector.

It is a still further object to prevent an operator's setting error.

In order to achieve the objects, there are provided means for detecting an output current or an output voltage of an inverter apparatus or a control signal supplied thereto to detect an output frequency of the inverter from the detected results and wired memory means structured by a switch represented by, for example, a dip switch (slide switch) having hardware contacts and possessing memory function by change-over or selection of lines, whereby data for setting an upper limit of the output frequency is held in the wired memory means in hardware manner.

Since a frequency produced by the inverter is applied from the detecting means of the output frequency of the inverter and the reliable upper limit of the output frequency which is not quite influenced by noise is applied from the wired memory means without permanent variation of data due to noise, the frequency and the upper limit are compared with each other to always suppress the output frequency of the inverter apparatus to the upper limit reliably.

As described above, when a capacity of an ac rotary electric machine such as an induction motor to be driven is large, it is common practice that the system thereof is expensive and a machine having a large capacity can not generally possess a large margin for the resistance to over-rotation. Accordingly, the excessively increased output frequency of the inverter apparatus is extremely undesirable. From this standpoint, the height of significance of the existence of the present invention would be appreciated readily.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Inverter apparatuses according to the present invention are now described in detail with reference to embodiments shown in the figures.

Figure 1:
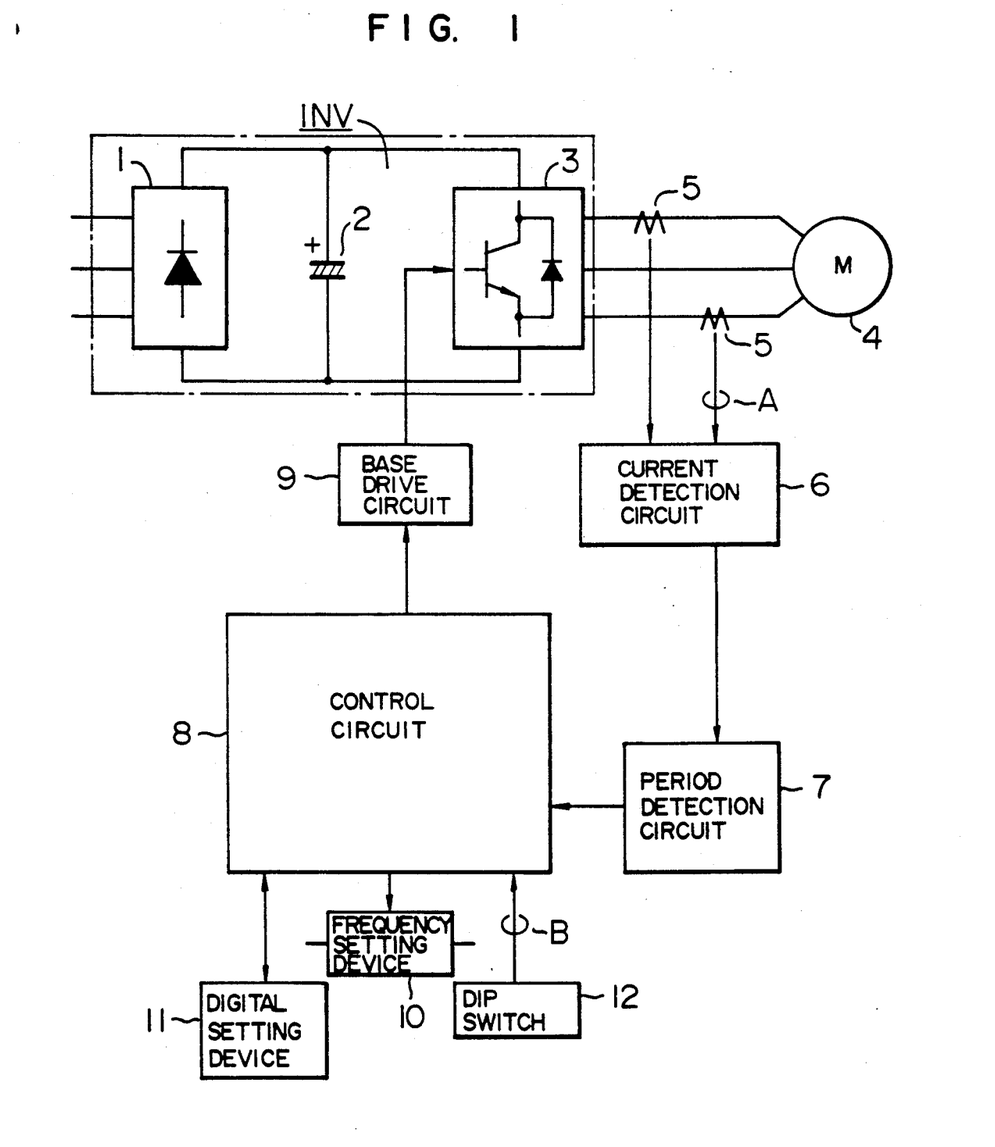
FIG. 1 is a block diagram showing a first embodiment of an inverter apparatus according to the present invention.

FIG. 1 shows a first embodiment of the inverter apparatus according to the present invention. In FIG. 1, numeral 1 denotes a power rectifier for converting a three-phase ac power into a dc power, 2 a smoothing condenser, and 3 a power inverter for converting the smoothed dc power into an ac power having a desired voltage and a desired frequency. These elements constitute a main circuit INV of a voltage type PWM (Pulse Width Modulation) inverter apparatus.

Numeral 4 denotes an induction motor to be driven (load), 5 a current detector for detecting an output phase current of the power inverter 3, 6 a current detection circuit for receiving an output of the current detector 5, 7 a period detection circuit for detecting a period of a detection signal of the current detection circuit 6, 8 a control circuit including a microcomputer, 9 a base drive circuit for driving switching elements constituting the power inverter 3, 10 a frequency setting device for controlling an output frequency of the inverter, and 11 a digital setting device for setting various operational conditions of the inverter and capable of displaying the conditions, if necessary.

The voltage type PWM inverter apparatus as structured above and its operation are well-known. In brief, the microcomputer provided in the control circuit 8 receives signals from the current detection circuit 6 and the frequency setting device 10 and controls the main circuit INV under the set operational condition so that the three-phase ac power having the predetermined voltage and frequency is supplied to the induction motor 4 to thereby attain effective variable speed operation of the induction motor 4.

Further, numeral 12 denotes a dip switch (digital switch) which constitutes wired memory means having memory function by means of change-over and selection of lines as described above and serves to hold a maximum allowable output frequency allowed in the inverter system in the hardware manner and supply it to the microcomputer within the control circuit 8.

Figure 2:
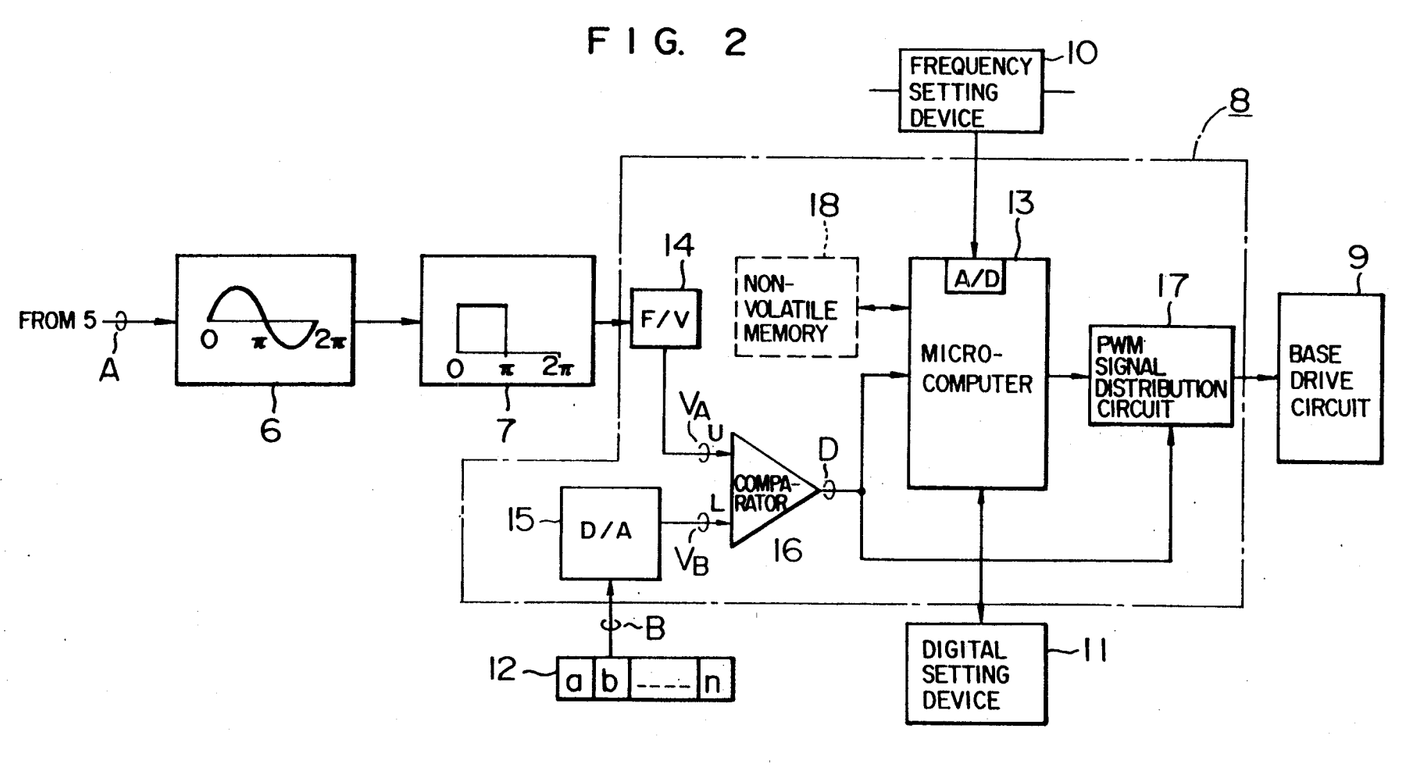
FIG. 2 is a detailed block diagram of a control circuit shown in FIG. 1.

FIG. 2 shows in detail a control portion including the control circuit 8 shown in FIG. 1.

In FIG. 2, numeral 13 denotes a microcomputer, 14 a frequency-to-voltage converter (F/V) for converting an output of the period detection circuit 7 into an analog value, 15 a digital-to-analog converter for converting a digital data supplied by the dip switch 12 into analog value, 16 a comparator for comparing the analog signals with each other, and 17 a PWM signal distribution circuit.

Operation of the embodiment is now described.

A phase current A of the inverter main circuit INV detected by the current detector 5 is supplied to the current detection circuit 6. The current detection circuit 6 removes a harmonic component from the detected phase current by a low pass filter or a band pass filter to supply only a fundamental component to the period detection circuit 7 so that the waveform of the signal is shaped. The waveform-shaped signal by the period detection circuit 7 is supplied to the frequency-to-voltage converter 14 to be converted into a signal $V_A$ having a voltage level proportional to the frequency of the phase current A and the converted signal is applied to one (upper) input terminal U of the comparator 16.

On the other hand, an output B of the dip switch 12 is supplied to the digital-to-analog converter 15 to be converted into a signal $V_B$ having a voltage level proportional to the digital data B selected by the digital switch 12. The converted signal is applied to the other (lower) input terminal L of the comparator 16.

Accordingly, the comparator 16 produces a signal D as follows:

$V_A < V_B \rightarrow$ "0" level $V_A \geq V_B \rightarrow$ "1" level

The output signal D of the comparator 16 is applied to the microcomputer 13 and the PWM signal distribution circuit 17. The microcomputer 13 supplies a predetermined signal to the digital setting device 11 when the signal D is turned to "1" level to indicate by letters such as, for example, "OVER-SPEED" that the output frequency of the inverter is increased excessively. Alternatively, the excessively increased state of the output frequency may be displayed by a red lamp or may be indicated by a buzzer.

Further, the PWM signal distribution circuit 17 stops distribution of the PWM signal produced by the microcomputer 13 when the signal D is turned to "1" level and cuts off the supply of the signal to the base drive circuit 9.

The characteristic of the frequency-to-voltage conversion circuit 14 is set so that the conversion circuit 14 produces the signal $V_A$ having a voltage of 10 V when a frequency of the signal produced by the period detection circuit 7 is 500 Hz, for example.

Further, the dip switch 12 for setting the maximum allowable output frequency (Fmax) of the inverter is configured to have n digits and it is previously defined that Fmax = 50 Hz when only the switch for the a-th digit is on, Fmax = 100 Hz when only the switch for the b-th digit is on and Fmax = 500 Hz when only the switch for the n-th digit is on. Correspondingly, the digital-to-analog converter 15 is designed so that the converter 15 produces the signal $V_B$ having a voltage of 1 V for an input signal from the switch for the a-th digit, the signal $V_B$ having a voltage of 2 V for an input signal from the switch for the b-th digit and the signal $V_B$ having a voltage of 10 V for an input signal from the switch for the n-th digit.

It is assumed that the upper limit of the output frequency control range by the frequency setting device 10 (FIG. 1) is, for example, 60 Hz and the maximum allowable output frequency Fmax therefor is 100 Hz. Thus, it is further assumed that the switch for the b-digit of the dip switch is set to the on state.

When the output frequency of the inverter main circuit INV increases and exceeds the frequency 60 Hz set by the frequency setting device 10 due to external noise or operator's setting error, for example, and an input frequency of the frequency-to-voltage converter 14 reaches 100 Hz, a level of the output signal D of the comparator 16 rises from "0" to "1" and accordingly at this time the output of the inverter main circuit INV is cut off so that it is prevented that the induction motor 4 becomes over-rotation state and at the same time this event can be displayed by letters or a red lamp in the digital setting device 11 in order to cause the operator to grasp it readily.

According to the embodiment, since the current detector 5 detects actually that the output frequency of the inverter main circuit INV increases and exceeds the frequency 60 Hz set by the frequency setting device 10, the exact operation can be attained, and since the data expressing the maximum allowable output frequency Fmax necessary for the detection is not stored in a semiconductor memory such as a non-volatile memory 18 of FIG. 2 but is held and set by the dip switch 12 in the hardware manner, the situation that the data expressing the maximum allowable output frequency Fmax is changed due to noise or the like permanently and does not return to the original data does not occur absolutely. Accordingly, the induction motor 4 can be always protected from over-rotation thereof reliably.

Further, in the first embodiment, since the current detector 5 provided with the inverter system is employed to detect the output frequency of the inverter main circuit INV on the basis of the period of the detected signal, any expensive detector for detecting a rotational speed of the induction motor 4 is not required additionally and a low-cost system can be attained.

In the embodiment, the current detector is employed to detect the output frequency of the inverter main circuit INV on the basis of the period of the output current.

Figure 3:
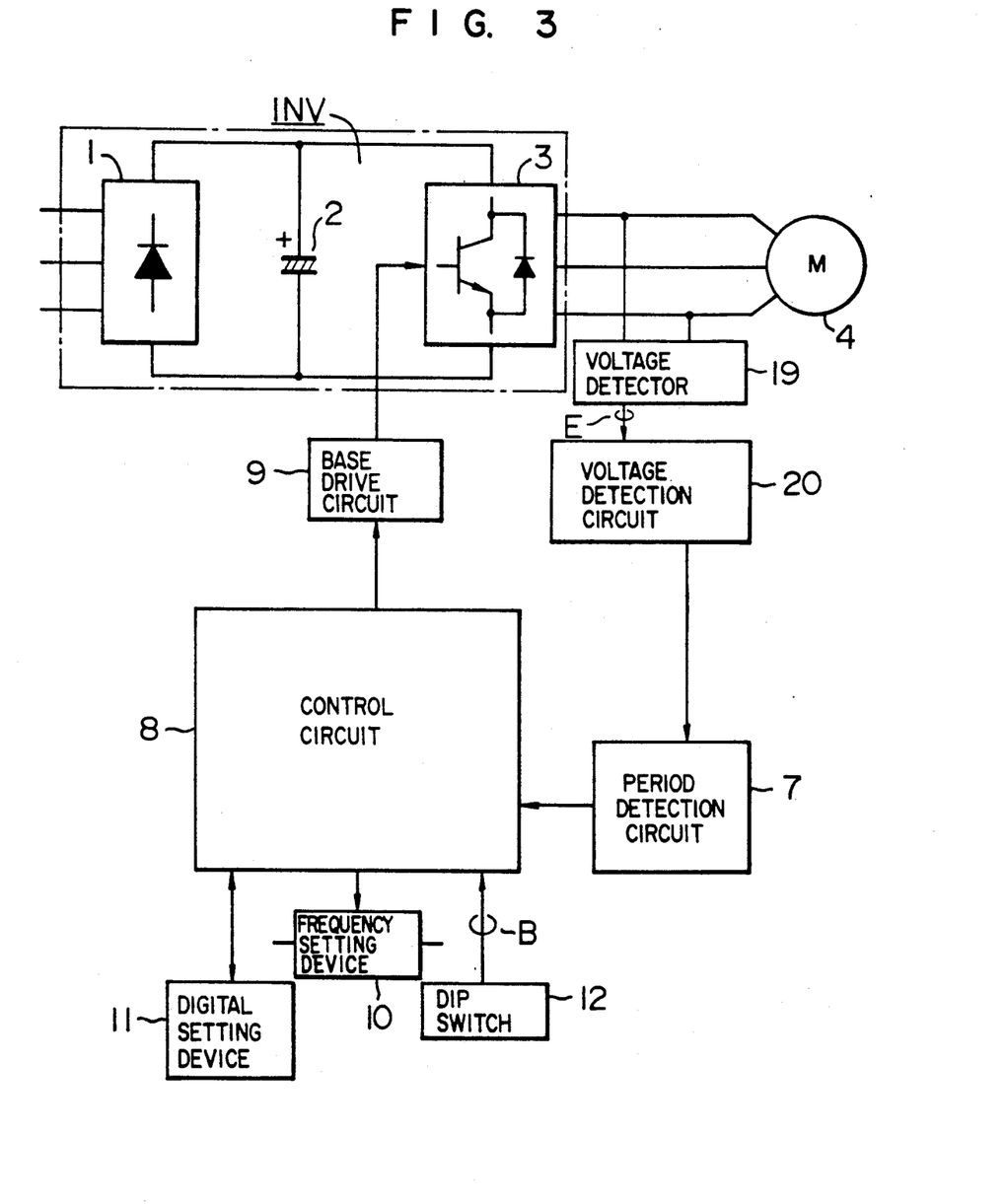
FIG. 3 is a block diagram showing a second embodiment of an inverter apparatus according to the present invention.
Figure 4:
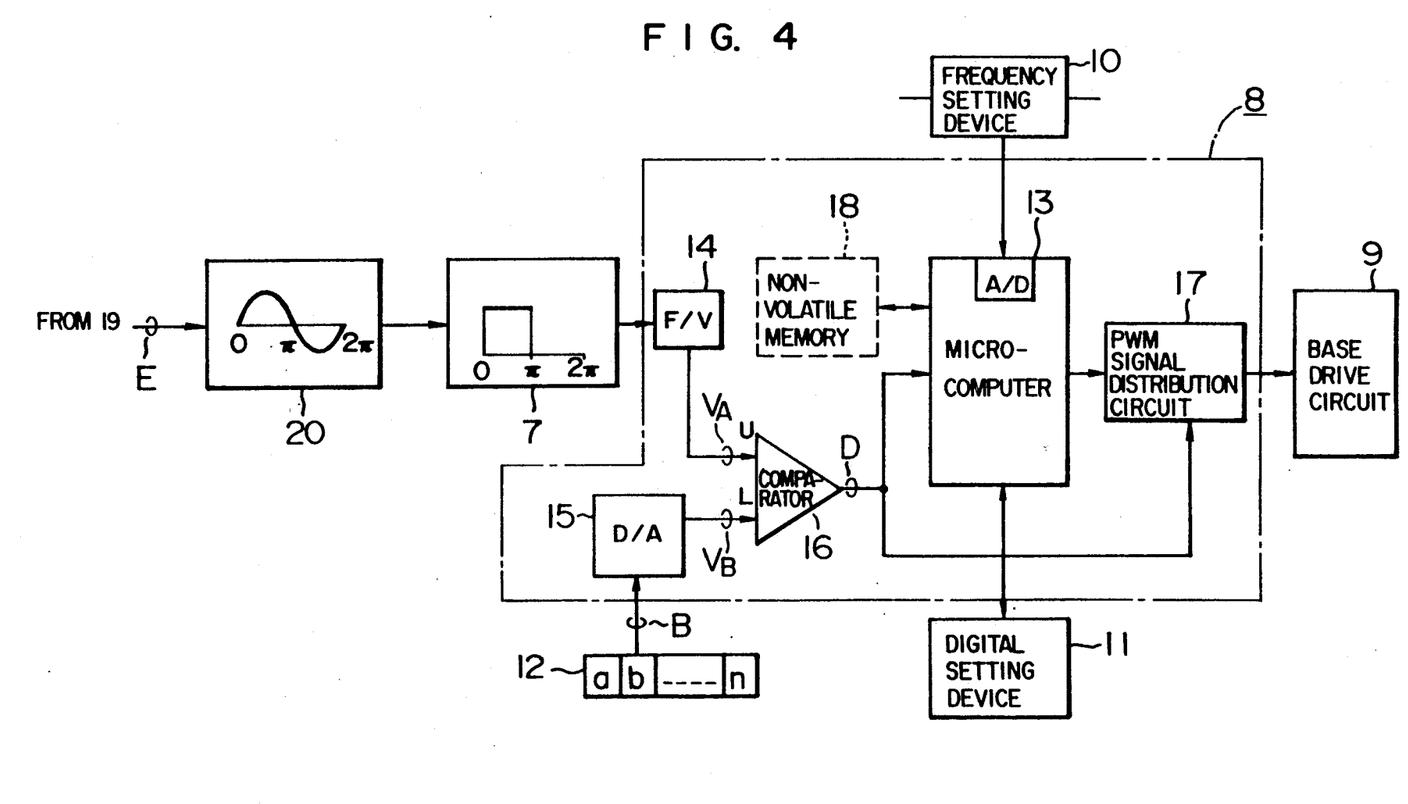
FIG. 4 is a detailed block diagram of a control circuit shown, in FIG. 3.

FIG. 3 is a block diagram showing a second embodiment of an inverter apparatus according to the present invention and FIG. 4 is a block diagram showing a control unit including a control circuit 8 shown in FIG. 3. In FIGS. 3 and 4, the same reference numerals as those of FIGS. 1 and 3 designate the same elements.

The inverter apparatus shown in FIG. 3 uses a voltage detector 19 instead of the current detector in FIG. 1 to detect the output frequency from the period of the output voltage of the inverter main circuit INV.

A line voltage of the inverter main circuit INV detected by the voltage detector 19 is supplied to the voltage detection circuit 20. The voltage detection circuit 20 removes a harmonic component from the detected voltage by a low pass filter or a band pass filter to supply only a fundamental component to the period detection circuit 7 in the same manner as in FIG. 1 so that the waveform of the signal is shaped. The signal having the waveform shaped by the period detection circuit 7 as shown in FIG. 4 is supplied to the frequency-to-voltage converter (F/V) 14 in quite the same manner as in FIG. 2 and is subjected to the same processing. Since the voltage detector 19 detects actually that the output frequency of the inverter main circuit INV increases and exceeds the frequency set by the frequency setting device 10, reliable operation can be attained.

Figure 5:
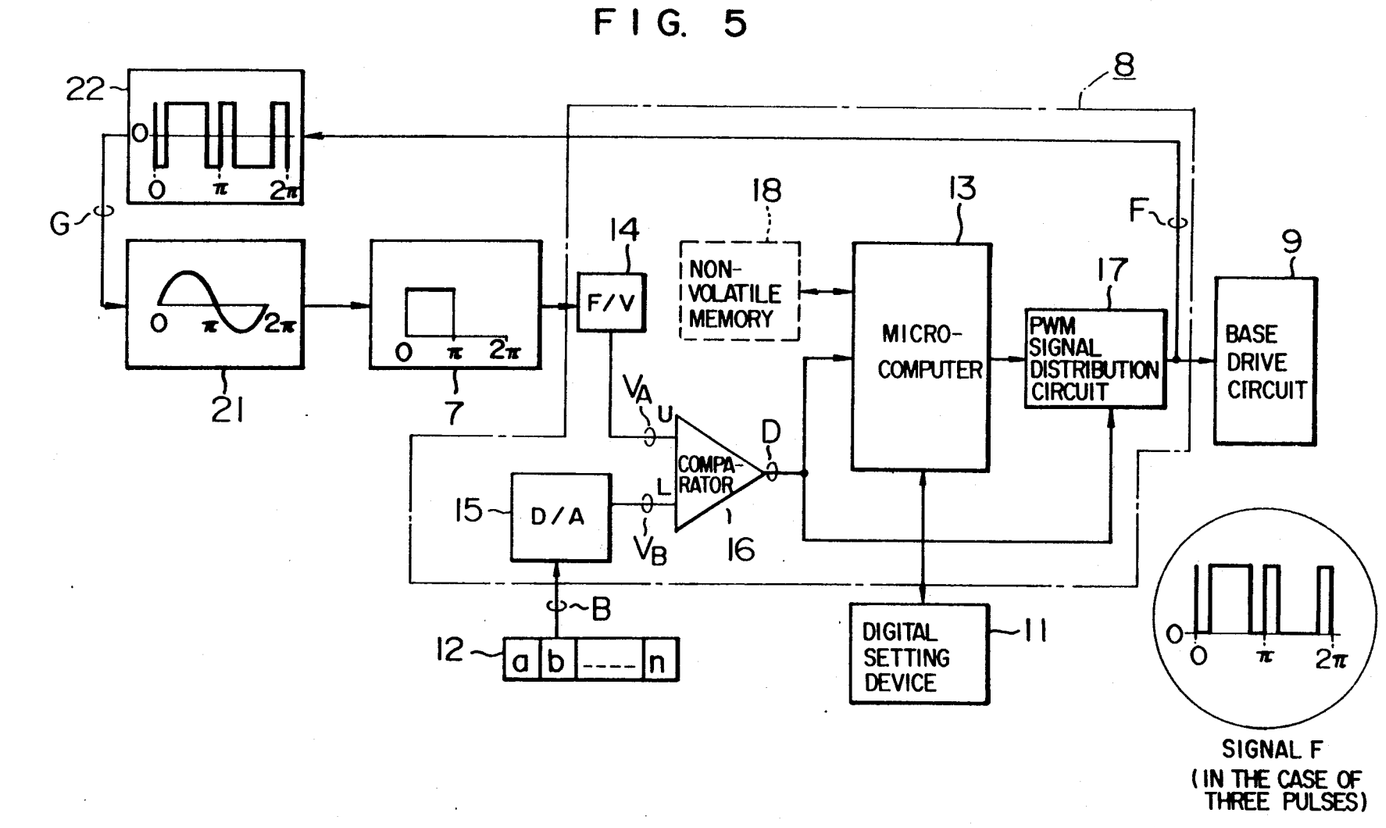
FIG. 5 is a detailed block diagram of a control circuit of a third embodiment of an inverter apparatus according to the present invention.

FIG. 5 is a detailed block diagram of a control circuit of a third embodiment of the inverter apparatus according to the present invention. In FIG. 5, the same reference numbers as those of FIG. 2 designate the same elements.

The third embodiment shown in FIG. 5 uses a logic PWM (Pulse Width Modulation) signal for PWM controlling switching elements of the power inverter 3 to detect the output frequency indirectly without direct detection of the actual output current or voltage of the inverter main circuit INV by the detector as disclosed in the first and second embodiments shown in FIGS. 1 and 3, respectively.

In FIG. 5, a signal F is one of output signals (in the example shown in FIG. 5, the case having three pulses is shown) of the PWM signal distribution circuit 17 for driving switching elements constituting the power inverter 3.

Since the signal F is to PWM control the switching elements of the power inverter 3 on the basis of the set value of the frequency setting device 10 of FIG. 1 and to control the induction motor (load) 4, it is apparent that the signal F contains information of the actual output frequency of the inverter main circuit INV. Accordingly, one output signal F of the PWM signal distribution circuit 17 is supplied to a level shift circuit 22 so that the signal F which is turned on and off on the side of only the positive potential from the zero potential is converted into a signal G which is turned on and off on the sides of the positive and negative potentials from the zero potential.

The signal F is supplied to a fundamental component detection circuit 21 which removes harmonic components therefrom by a low pass filter or a band pass filter to produce only the fundamental component which is supplied to tee period detection circuit 7 in which a waveform thereof is shaped.

The signal having the waveform shaped by the period detection circuit 7 is supplied to the frequency-to-voltage converter (F/V) in quite the same manner as in FIG. 2 and the same operation is performed. Accordingly, since the logic PWM signal can be used to detect the output frequency of the inverter main circuit INV indirectly, reliable protection operation can be attained in the same manner as the previous embodiment.

Figure 6:
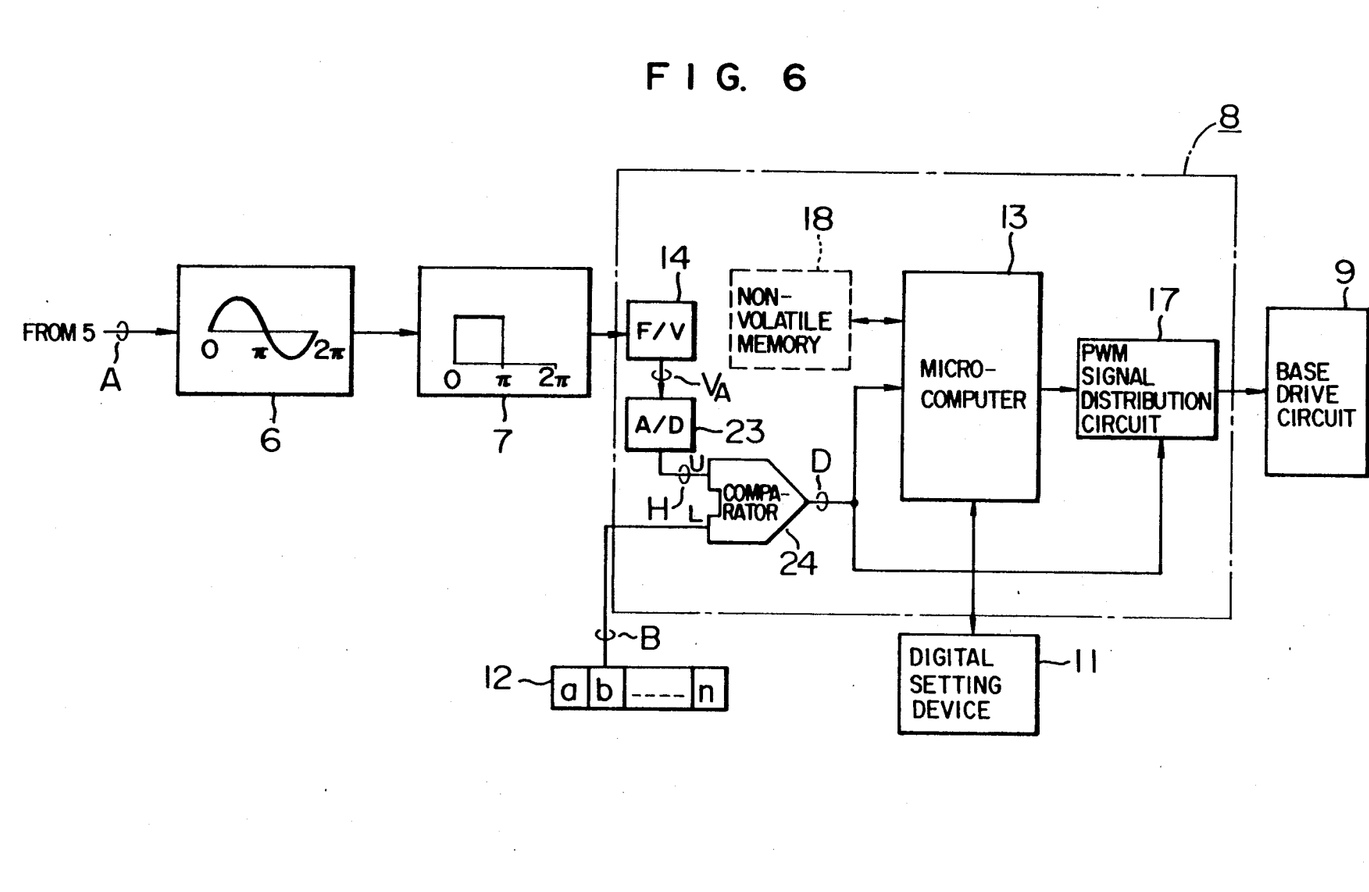
FIG. 6 is a detailed block diagram of a control circuit of a fourth embodiment of an inverter apparatus according to the present invention.
Figure 7:
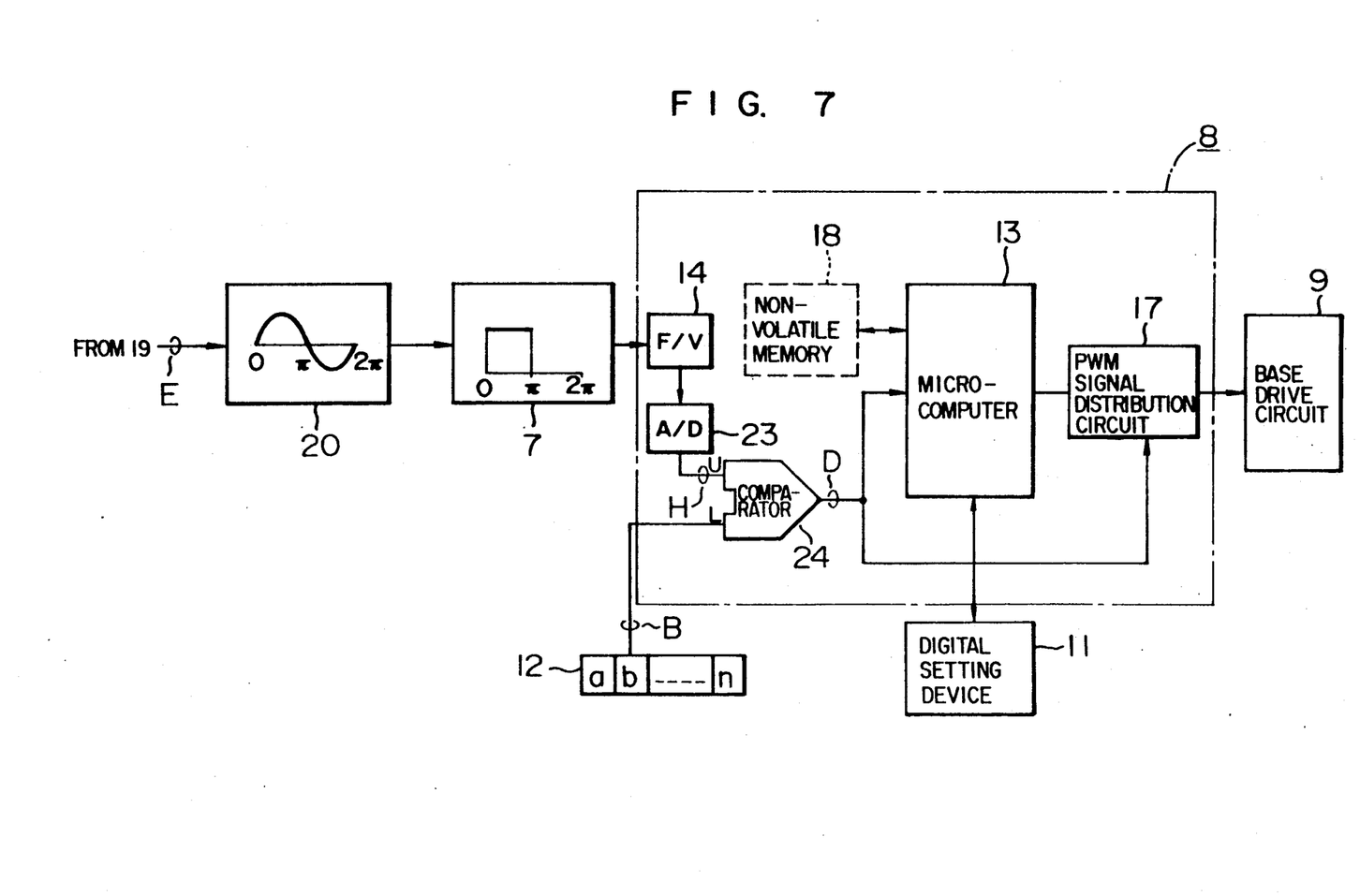
FIG. 7 is a detailed block diagram of a control circuit of a fifth embodiment of an inverter apparatus according to the present invention.
Figure 8:
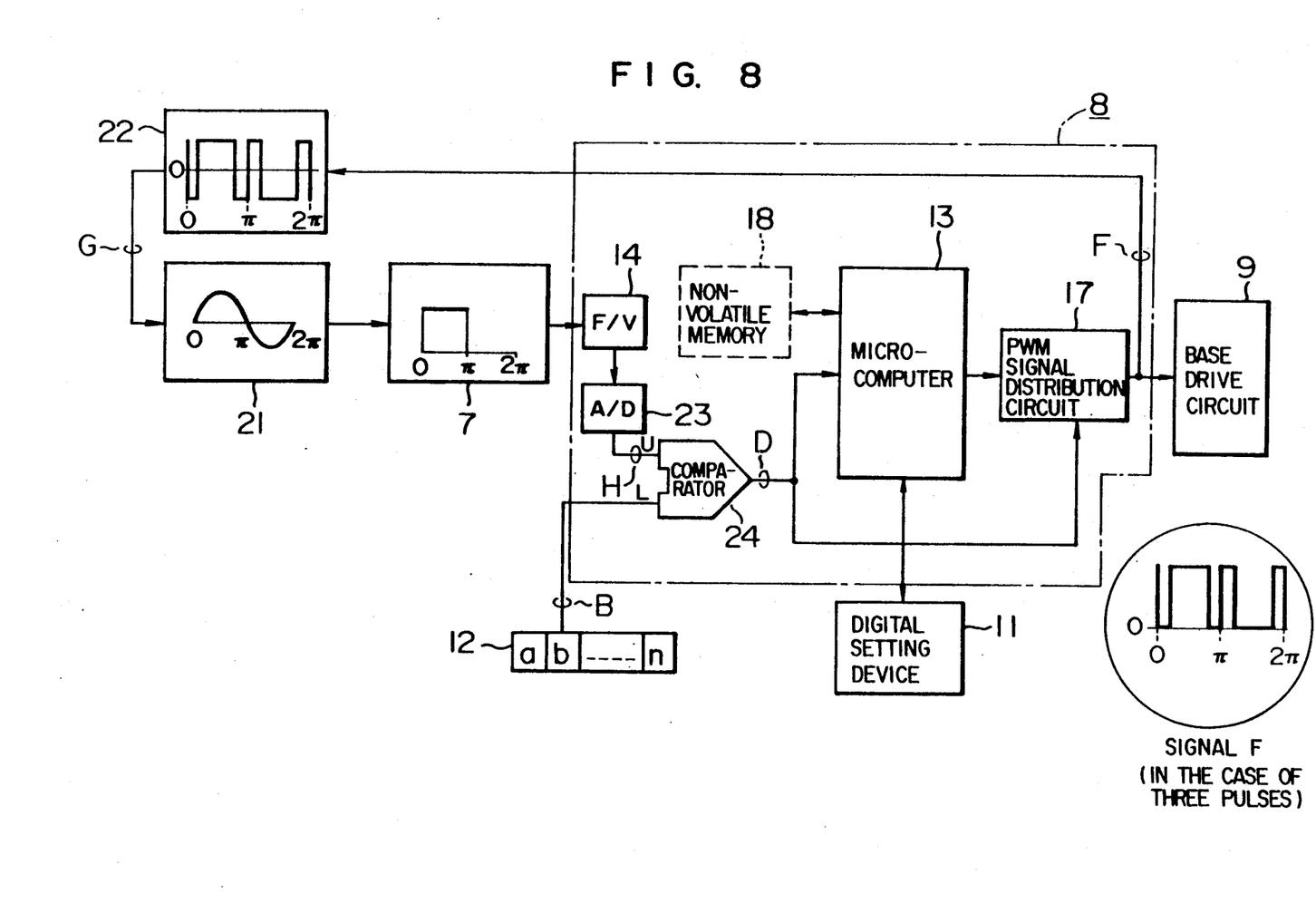
FIG. 8 is a detailed block diagram of a control circuit of a sixth embodiment of an inverter apparatus according to the present invention.

FIGS. 6, 7 and 8 are detailed block diagrams of control circuits of fourth, fifth and sixth embodiments of inverter apparatuses according to the present invention. In the embodiments shown in FIGS. 2, 4 and 5, the comparator 16 is an analog comparator, while in the embodiments shown in FIGS. 6, 7 and 8, a comparator 24 is constituted by a digital comparator for comparing digital signals with each other.

Particularly, FIG. 6 corresponds to FIG. 2 and shows the embodiment utilizing the signal A representative of the output frequency of the inverter main circuit INV detected by using the current detector 5. FIG. 7 corresponds to FIG. 4 and shows the embodiment utilizing a signal E using the voltage detector 9. FIG. 8 corresponds to FIG. 5 and shows the embodiment utilizing the logic PWM signal G. In FIGS. 6, 7 and 8, the same reference numerals as those of FIG. 2 designate the same elements.

In FIG. 6, the signal A from the current detector 5 is supplied to the current detection circuit 6 which removes harmonic components therefrom by a low pass filter or a band pass filter to produce only the fundamental component which is supplied to the period detection circuit 7 in which a waveform thereof is shaped.

The signal having the shaped waveform is supplied to the frequency-to-voltage converter (F/V) 14 to be converted into a signal VA having a voltage level proportional to a frequency of the phase current A. The signal VA is supplied to the analog-to-digital converter 23 to be converted into a digital signal H proportional to the analog signal VA and supplied to one (upper) input terminal U of the digital comparator 24.

On the other hand, an output of the dip switch 12 is supplied to the other (lower) input terminal 1 of the digital comparator 24 as a digital signal B.

Accordingly, the digital comparator 24 produces a signal D having a level as follows:

$H < B \rightarrow$ "0" level

The processing operation subsequent to the signal D is quite the same as in FIG. 2 and accordingly description thereof is omitted.

As described above, since FIG. 7 shows the embodiment using the signal E of the voltage detector 19 instead of the signal A of the current detector 5 in FIG. 6 and FIG. 8 shows the embodiment using the logic PWM signal F, the operation principle thereof is the same as that of FIG. 6 and the same effects are attained. Accordingly, description thereof is omitted.

According to the present invention, the inverter apparatus using a digital control system by a microcomputer and capable of easily improving user's treatment therefor can prevent and protect over-rotation of the ac rotary electric machine such as the induction motor constituting a load of the inverter apparatus always reliably. Further, there are excellent effects that the inverter apparatus is not influenced by external noise, operator's setting error is prevented, any special motor for both shafts is not required and an existing motor can be used.

We claim:

1. An inverter apparatus of a system controlling an output frequency by a microcomputer in which a predetermined control condition is set and wherein the microcomputer is susceptible to noise thereby resulting in inadvertent changes in the predetermined control condition comprising frequency detection means external of the microcomputer for detecting the output frequency of the inverter, hard wired setting means external of the microcomputer for setting data representative of a predetermined frequency for setting of the predetermined control condition and for being substantially insusceptible to noise so as to retain the set data representative of the predetermined frequency for the predetermined control condition without permitting changing of the set data in response to noise, and comparison means external of the microcomputer for producing a predetermined control signal for application at least to the microcomputer in accordance with the predetermined control condition when an output of the frequency detection means exceeds a level of data read out of the hard wired setting means so the increase of the output frequency is reliably limited by the output signal of the comparison means in accordance with the set data representative of the predetermined frequency provided by the hard wired setting means irrespective of noise in the system.

2. An inverter apparatus according to claim 1, wherein the frequency detection means detects the output frequency of the inverter from a detection signal of a current detector which detects an output current of a power inverter.

3. An inverter apparatus according to claim 1, wherein the frequency detection means detects the output frequency of the inverter from a detection signal of a voltage detector which detects an output voltage of a power inverter.

4. An inverter apparatus according to claim 1, wherein the frequency detection means detects the output frequency of the inverter from a logic PWM signal supplied to a power inverter.

5. An inverter apparatus according to claim 1, wherein the hard wired setting means comprises a dip switch.

6. An inverter apparatus according to claim 1, wherein the comparison means comprises a hard wired analog comparator for comparing analog signals with each other.

7. An inverter apparatus according to claim 1, wherein the comparison means comprises a hard wired digital comparator for comparing digital signals with each other.

8. An inverter apparatus according to claim 1, further comprising a digital setting device for displaying that the output frequency of the inverter apparatus is excessively increased, the digital setting device displaying an over-speed state.

9. An inverter apparatus according to claim 1, wherein the frequency detection means which is external of the microcomputer includes hard wired detector means for detecting the output frequency of the inverter from one of a detection signal of a current detector which detects an output current of a power inverter, a detection signal of a voltage detector which detects an output voltage of the power inverter, and a logic PWM signal supplied to the power inverter, the hard wired setting means comprises a dip switch, and the comparison means comprises one of a hard wired analog comparator for comparing analog signals with each other and a hard wired digital comparator for comparing digital signals with each other.

10. An inverter apparatus according to claim 9, further comprising a digital setting device for displaying that the output frequency of the inverter apparatus is excessively increased, the digital setting device displaying an over-speed state.

* * * * *